United States Patent
Barthel et al.

(10) Patent No.: US 10,968,952 B2
(45) Date of Patent: Apr. 6, 2021

(54) ROLLER BEARING UNIT WITH A SECURING RING, AND METHOD FOR DISASSEMBLING A SECURING RING

(71) Applicant: Schaeffler Technologies AG & Co. KG, Herzogenaurach (DE)

(72) Inventors: Bernd Barthel, Gerolzhofen (DE); Lukas Schraut, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/606,542

(22) PCT Filed: Mar. 28, 2018

(86) PCT No.: PCT/DE2018/100285
§ 371 (c)(1),
(2) Date: Oct. 18, 2019

(87) PCT Pub. No.: WO2018/192614
PCT Pub. Date: Oct. 25, 2018

(65) Prior Publication Data
US 2020/0096040 A1 Mar. 26, 2020

(30) Foreign Application Priority Data

Apr. 20, 2017 (DE) .................... 10 2017 003 817.1
May 22, 2017 (DE) .................... 10 2017 111 044.5

(51) Int. Cl.
*F16C 33/60* (2006.01)
*F16C 33/58* (2006.01)
*F16C 19/36* (2006.01)

(52) U.S. Cl.
CPC ............ *F16C 33/60* (2013.01); *F16C 33/586* (2013.01); *F16C 19/364* (2013.01); *F16C 2226/74* (2013.01); *F16C 2326/02* (2013.01)

(58) Field of Classification Search
CPC ...... F16C 33/60; F16C 2226/74; F16C 43/04; F16C 41/04; F16C 33/586; F16C 2326/02; F16C 19/364; B25B 27/30; B25B 27/308; B25B 27/0028; B25B 27/0092; F16B 2/04
See application file for complete search history.

(56) References Cited

U.S. PATENT DOCUMENTS 2,324,847 A * 7/1943 Kaplan .................. B25B 27/20
29/222
4,813,120 A * 3/1989 Fournier ............. B25B 27/0028
29/235

FOREIGN PATENT DOCUMENTS

| CN | 101133256 a | 2/2008 |
| CN | 201269266 Y | 7/2009 |
| CN | 203655892 U | 6/2014 |

(Continued)

OTHER PUBLICATIONS

Machine Translation of DE 102013220702 (Year: 2013).*
Machine Translation of DE 19955390 (Year: 2001).*

*Primary Examiner* — Alan B Waits
(74) *Attorney, Agent, or Firm* — Antun M. Peakovic

(57) ABSTRACT

A multi-row rolling bearing unit including an outer ring and at least two inner rings, between which rolling bodies are guided, and an elastic securing ring which engages in annular grooves of the inner rings, the securing ring having a U-shaped cross-sectional profile with two flanks which engage in the annular grooves.

7 Claims, 2 Drawing Sheets

(56) References Cited

FOREIGN PATENT DOCUMENTS

DE          19955390 A1   5/2001
DE    102013220702 A1   4/2015

\* cited by examiner

ROLLER BEARING UNIT WITH A SECURING RING, AND METHOD FOR DISASSEMBLING A SECURING RING

CROSS-REFERENCE TO RELATED APPLICATIONS

This application is the U.S. National Phase of PCT Appln. No. PCT/DE2018/100285 filed Mar. 28, 2018 which claims priority to DE102017003817.1 filed Apr. 20, 2017 and DE102017111044.5 filed May 22, 2017 the entire disclosures of which are incorporated by reference herein.

TECHNICAL FIELD

The disclosure relates to a rolling bearing unit with a securing ring. The disclosure furthermore relates to a securing ring and a method for disassembling a securing ring.

BACKGROUND

DE 10 2013 220 702 A1 discloses a rolling bearing unit embodied as a multi-row rolling bearing with at least one outer ring and at least two inner rings, between which rolling bodies are guided. Adjacent inner rings are supported on one another with axial front sides oriented toward one another. In order to secure an axial position, a fixing element which engages in annular grooves of the inner rings is provided, wherein the fixing element is an elastic securing ring, which encloses a joint, with a U-profile and which is supported in a preassembly position frictionally on an inner wall of the inner ring, wherein overlapping ring ends of the securing ring are connected in a positive-locking manner for axial guidance and the securing ring is displaceable into an end position. The flanks of the securing ring lock automatically in corresponding annular grooves of the adjacent inner rings.

SUMMARY

An embodiment of the present disclosure lies in further developing a rolling bearing unit with a securing ring and creating a simple method for disassembling the securing ring. In particular, disassembly of the securing ring should be enabled without a special tool.

A rolling bearing unit according to the disclosure is embodied as a multi-row rolling bearing and comprises at least one outer ring and at least two inner rings, between which rolling bodies are guided, wherein adjacent inner rings with axial front sides oriented toward one another are supported on one another and have, in order to secure an axial position, an elastic securing ring which engages in annular grooves of the inner rings, wherein the securing ring has a substantially U-shaped cross-sectional profile with two flanks which engage in the annular grooves, wherein the securing ring furthermore has a first and a second ring end, wherein a joint is formed in the circumferential direction between the two ring ends, wherein an at least partially tapered projection is formed on the first ring end for simplified assembly of the securing ring, wherein a substantially flat lever tongue is formed on the second ring end for simplified disassembly of the securing ring, wherein the lever tongue is arranged axially between the annular grooves and is formed to be axially larger than an axial minimum distance between the two annular grooves, wherein an axial protrusion of the lever tongue is furthermore provided for actuation during disassembly of the securing ring.

The disclosure includes the technical teaching that the securing ring is formed from a metallic material, in particular from a spring steel. In particular, the securing ring is produced in a non-machining manner by separation and reshaping from a sheet metal material. The two flanks are produced by bending. The shaping of the ring ends, in particular the shaping at the tapered projection and at the lever tongue is performed by punching.

The tapered projection directly adjoins the first ring end and has two chamfers which produce a tapering. As a result of the chamfers, a tilting of the ring ends is avoided and a minimal gap between the ring ends in the installed state is enabled. In particular, the tapered projection is formed to be trapezoidal. The tapered projection is provided to simplify a latching of the securing ring into the annular grooves provided for this on the inner rings and as a result assembly of the securing ring. In a preassembly position of the securing ring on the inner ring, an adjustment of the diameter of the securing ring on an inner circumferential surface of the inner ring is carried out, as a result of which the securing ring is radially pretensioned. A frictional support of the securing ring on the inner circumferential surface of the inner ring is thus carried out. This support brings about a spiral-shaped arrangement of the ring ends for the formation of a local overlapping. The tapered projection prevents a tilting of the two ring ends during overlapping.

The lever tongue formed on the second ring end serves the purpose of simplified disassembly of the securing ring. In the installation state of the securing ring on the inner ring, the flanks of the securing ring lock into the corresponding annular grooves. In comparison with a preassembly position of the securing ring, the securing ring is spread apart in the installation state. The joint between the two ring ends is set such that its length is reduced and is as small as possible in comparison with the joint in a non-assembled state or delivery state of the securing ring. The two ring ends thus do not come to bear against one another in the installation state. Due to the fact that the lever tongue is formed to be substantially flat and has no radially formed flanks which engage in annular grooves, for disassembly of the securing ring from the annular grooves, a tool can be pushed into one of the two annular grooves on the inner ring until the tool comes to bear against the axial protrusion on the lever tongue of the securing ring in order to remove the securing ring from the annular groove by means of a lever action of the tool. An axial protrusion refers to a situation where the lever tongue arranged axially between the annular grooves is formed to be axially larger than the axial minimum distance between the two annular grooves. The term axial minimum distance between the two annular grooves refers to a minimum distance which is set between the two annular grooves in the case of inner rings which are supported on one another on axial front sides directed toward one another. The axial protrusion in the installation state of the securing ring thus projects at least partially axially into at least one of the two annular grooves. The axial protrusion of the lever tongue is actuated during disassembly of the securing ring by the tool, in particular tilts the tool on the axial protrusion. The tool is, for example, a simple slotted screwdriver. The lever tongue is formed to be rectangular in order to provide adequate bearing surface for the tool. The lever tongue thus has a straight edge under which the tool is pushed in order to lever out the securing ring.

The axial protrusion is preferably provided to receive a tool, wherein the respective inner ring has an edge which adjoins the respective annular groove and which is provided as a fulcrum for the tool. In other words, the tool is supported on the edge of the annular groove during disassembly of the securing ring and rotates about a fulcrum in order to release the securing ring from the annular groove.

A joint which arises in the non-installed state between the two ring ends of the securing ring is furthermore larger than a joint which arises in the end position of the securing ring on the inner ring. The securing ring in the installation state on the inner ring thus has a pretensioning.

BRIEF DESCRIPTION OF THE DRAWINGS

Further measures which improve the disclosure are explained in greater detail below in conjunction with the description of a exemplary embodiment of the disclosure on the basis of the figures. In the figures

DETAILED DESCRIPTION

Figure 1:
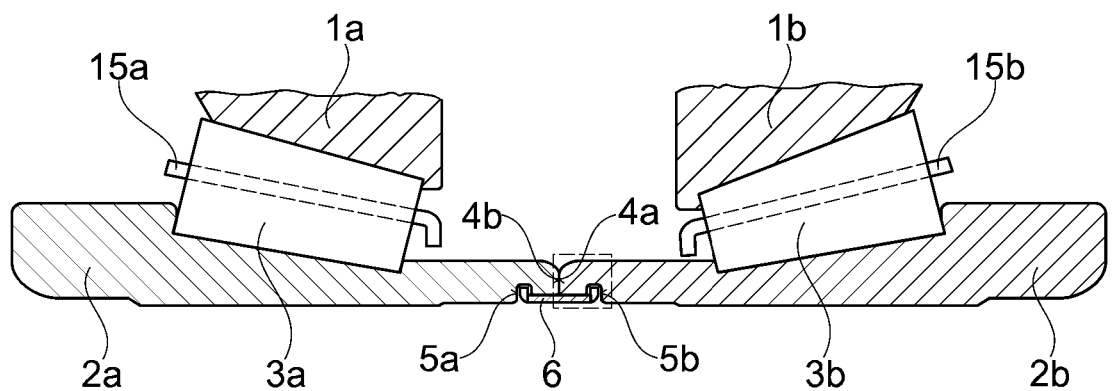
FIG. 1 shows a schematic semi-sectional representation of a rolling bearing unit according to the disclosure.

According to FIG. 1, a rolling bearing unit according to the disclosure, which is provided, for example, for a wheel bearing of a motor vehicle, not represented here, has two rolling bearings which are joined together in mirror symmetry and formed as tapered roller bearings with in each case an outer ring 1a, 1b, with in each case an inner ring 2a, 2b and tapered rollers arranged therebetween as rolling bodies 3a, 3b which are guided in each case in a rolling body cage 15a, 15b. Inner rings 2a, 2b are supported against one another on the facing sides in each case via front sides 4a, 4b. Moreover, respective inner ring 2a, 2b has a respective annular groove 5a, 5b on a respective inner circumferential surface, wherein, in order to secure an axial position of the two inner rings 2a, 2b, an elastic securing ring 6 which engages in annular grooves 5a, 5b of inner rings 2a, 2b is arranged. Securing ring 6 sits, in the installed state presently represented, between the two inner rings 2a, 2b which are held together by securing ring 6. The two-row tapered roller bearing represented in the present case in an O-arrangement is used as a wheel bearing in an HGV. Securing ring 6 is pushed in a pretensioned manner into the bearing until said ring jumps up in annular grooves 5a, 5b provided for this purpose of inner rings 2a, 2b and frictionally connects inner rings 2a, 2b to its profile, namely the two flanks. Securing ring 6 is represented in an enlarged manner in FIG. 3.

Figure 3:
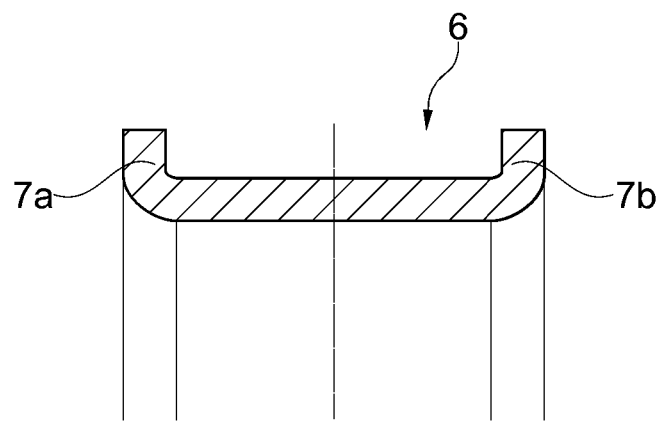
FIG. 3 shows a schematic semi-sectional representation of the securing ring according to FIG. 1.

According to FIG. 3, securing ring 6 has a substantially U-shaped cross-sectional profile with two flanks 7a, 7b formed to be substantially radial. Both flanks 7a, 7b are provided to engage in annular grooves 5a, 5b on inner rings 2a, 2b of the rolling bearing unit and thus axially fix inner rings 2a, 2b.

Figure 4:
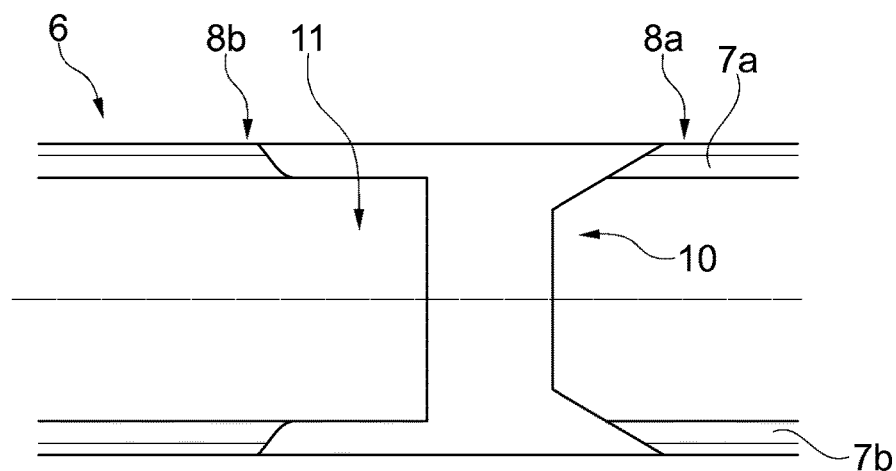
FIG. 4 shows a schematic radial detailed top view of the partially represented securing ring according to FIG. 1.
Figure 5:
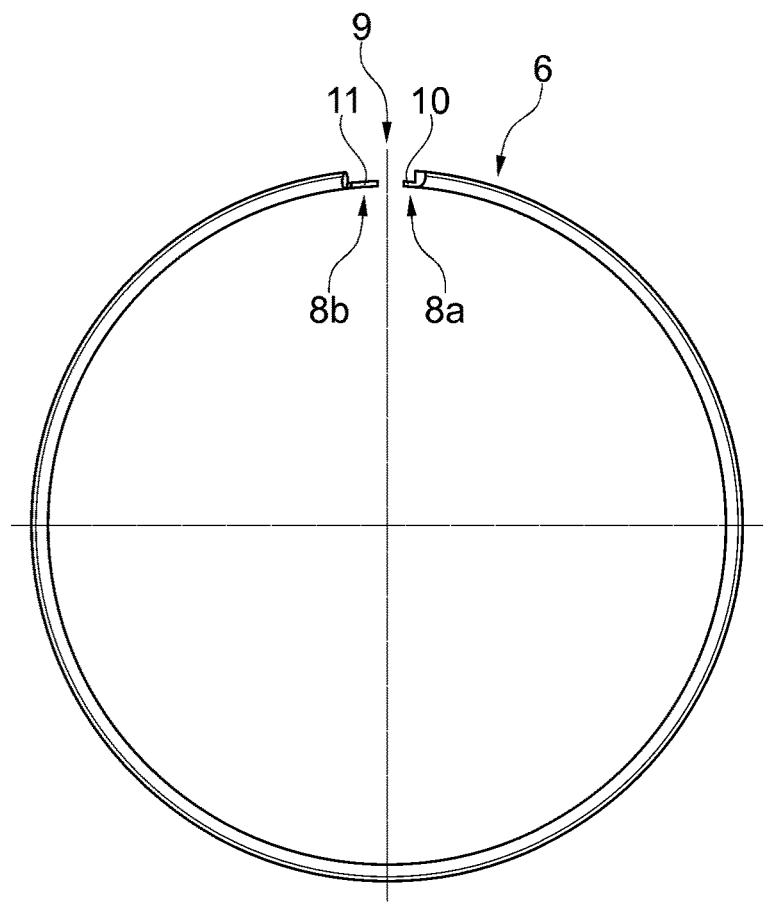
FIG. 5 shows a schematic lateral detailed top view of the securing ring according to FIG. 1.

In FIG. 5, securing ring 6 is represented in full. Securing ring 6 is formed from a metallic material, in particular from a spring steel. It is apparent from FIG. 5 that securing ring 6 has a first and a second ring end 8a, 8b, wherein a joint 9 is formed in the circumferential direction between the two ring ends 8a, 8b. The two ring ends 8a, 8b are formed to be asymmetrical to one another. A projection 10 is formed on first ring end 8a for simplified assembly of securing ring 6. Moreover, a substantially flat lever tongue 11 is formed on second ring end 8b for simplified disassembly of securing ring 6. Both ring ends 8a, 8b of securing ring 6 are represented in an enlarged form in FIG. 4.

According to FIG. 4, lever tongue 11 is formed to be rectangular. In contrast, projection 10 is formed to be at least partially tapered. Flanks 7a, 7b extend circumferentially from first ring end 8a up to second ring end 8b, but not along projection 10 and lever tongue 11. Projection 10 and lever tongue 11 are thus free from flanks 7a, 7b. The shaping of lever tongue 11 is realized by a suitable punching tool. In this case, the length of lever tongue 11 at which the two flanks 7a, 7b, i.e. the profile for latching in is removed, is selected so that both ring ends 8a, 8b, including joint 9 therebetween, can be formed by an optimized blanking die in a production step.

Figure 2A:
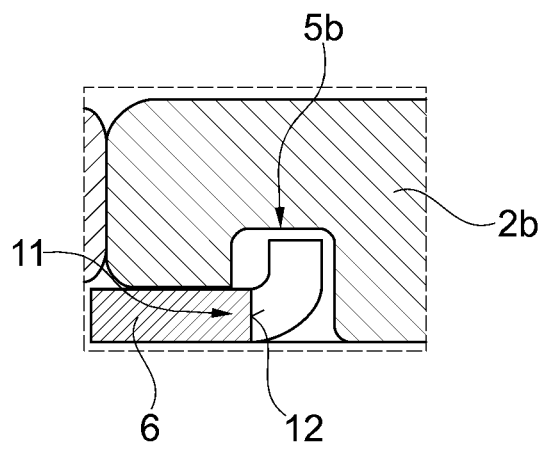
FIG. 2a shows a schematic detailed sectional representation of a securing ring, which is arranged in an annular groove and half of which is represented, of the rolling bearing unit according to FIG. 1.
Figure 2B:
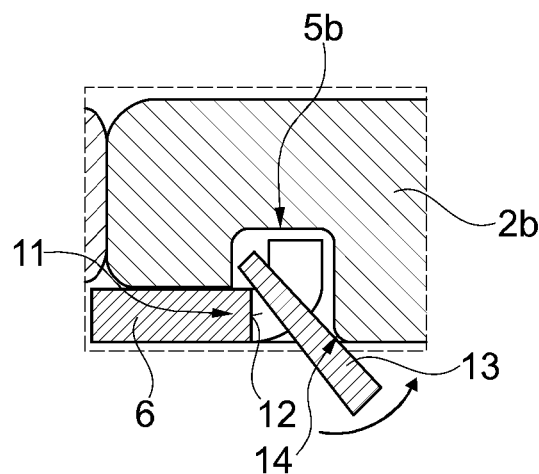
FIG. 2b shows a schematic detailed sectional representation of the securing ring, which is arranged in the annular groove and half of which is represented, of the rolling bearing unit according to FIG. 1 during disassembly of the securing ring.

According to FIGS. 2a and 2b, securing ring 6 is represented in annular groove 5b on inner ring 2b. Securing ring 6 is also located in annular groove 5a, not represented here, on inner ring 2a in order to connect both inner rings 2a, 2b in a positive-locking manner axially to one another. It is apparent from FIGS. 2a and 2b that lever tongue 11 has an axial protrusion 12. Lever tongue 11 is thus formed to be axially larger than an axial minimum distance between the two annular grooves 5a, 5b. Axial protrusion 12 is provided for actuation during disassembly of securing ring 6.

The disassembly of securing ring 6 from annular groove 5b is represented in FIG. 2b. Axial projection 12 serves to receive a tool 13, wherein inner ring 2b has an edge 14 which adjoins annular groove 5b and which is provided as a fulcrum for tool 13. Tool 13 is thus pushed into annular groove 5b on inner ring 2b and supported on axial protrusion 12 on lever tongue 11 of securing ring 6. During disassembly of securing ring 6, tool 13 rotates about the fulcrum at edge 14 and as a result releases first ring end 8a of securing ring 6 from annular groove 5b. If first ring end 8a of securing ring 6 no longer snaps into annular grooves 5a, 5b, complete securing ring 6 can be easily removed.

LIST OF REFERENCE NUMBERS 1a, 1b Outer ring
2a, 2b Inner ring
3a, 3b Rolling body
4a, 4b Front side
5a, 5b Annular groove
6 Securing ring
7a, 7b Flanks
8a, 8b Ring end
9 Joint
10 Projection
11 Lever tongue
12 Axial protrusion
13 Tool
14 Edge
15a, 15b Rolling body cage

The invention claimed is:

1. A rolling bearing unit, comprising:
   at least one outer ring and at least two inner rings, between which rolling bodies are guided;
   wherein adjacent inner rings with axial front sides oriented toward one another are supported on one another and have, in order to secure an axial position, an elastic securing ring which engages in annular grooves of the inner rings;
   wherein the securing ring has a substantially U-shaped cross-sectional profile with two flanks which engage in the annular grooves;
   wherein the securing ring furthermore has a first and a second ring end;
   wherein a joint is formed in the circumferential direction between the two ring ends;
   wherein a tapered projection is formed on the first ring end,
   wherein a rectangular, substantially flat lever tongue is formed on the second ring end;
   wherein the lever tongue is arranged axially between the annular grooves and is formed to be axially larger than an axial minimum distance between the two annular grooves;
   wherein an axial protrusion of the lever tongue is furthermore provided for actuation during disassembly of the securing ring.

2. The rolling bearing unit of claim 1,
   wherein the axial protrusion is provided to receive a tool, wherein the respective inner ring has an edge which adjoins the respective annular groove and is provided as a fulcrum for the tool.

3. The rolling bearing unit of claim 1,
   wherein the joint is larger when the securing ring is in a non-installed state.

4. The rolling bearing unit of claim 1,
   wherein the securing ring is formed from a metallic material.

5. The rolling bearing unit of claim 4, wherein the metallic material is spring steel.

6. A securing ring for a rolling bearing unit, comprising:
   the securing ring having a substantially U-shaped cross-sectional profile with two substantially radially formed flanks;
   wherein the two flanks are provided to engage in annular grooves on inner rings of the rolling bearing unit and thus axially fix the inner rings;
   wherein the securing ring has a first and a second ring end;
   wherein a joint is formed in the circumferential direction between the two ring ends;
   wherein a tapered projection is formed on the first ring end,
   wherein a rectangular, substantially flat lever tongue is formed on the second ring end;
   wherein the lever tongue has an axial protrusion;
   wherein the lever tongue is formed to be axially larger than an axial minimum distance between the two annular grooves;
   wherein the axial protrusion is provided for actuation during disassembly of the securing ring.

7. A method for disassembling the securing ring of claim 6 from annular grooves of inner rings of a rolling bearing unit, comprising:
   pushing a tool into one of the two annular grooves on the inner ring;
   bearing against the axial protrusion on the lever tongue of the securing ring; and
   levering the tool in order to remove the securing ring from the annular groove.

* * * * *

UNITED STATES PATENT AND TRADEMARK OFFICE
CERTIFICATE OF CORRECTION

PATENT NO. : 10,968,952 B2  
APPLICATION NO. : 16/606542  
DATED : April 6, 2021  
INVENTOR(S) : Barthel et al.

Page 1 of 1

It is certified that error appears in the above-identified patent and that said Letters Patent is hereby corrected as shown below:

On the Title Page

Item (72), Inventors, after "Lukas Schraut, Werneck (DE)", insert: --Klaus Becker, Glattbach (DE)--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*